Oct. 11, 1966   G. V. WOODLING   3,278,206
COUPLING CONNECTION HAVING A LAMINATED CONTRACTIBLE SLEEVE
Filed Sept. 14, 1964
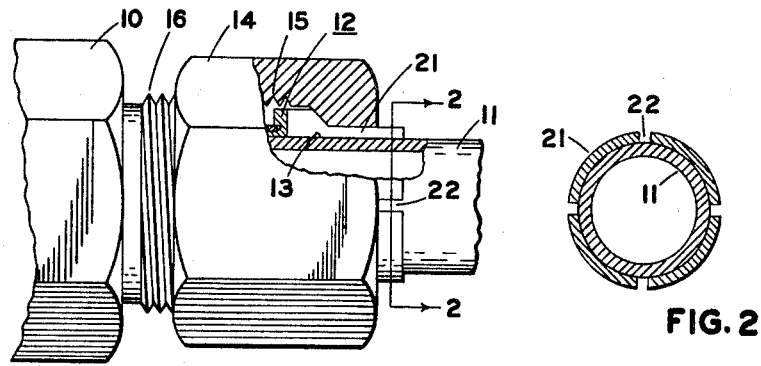
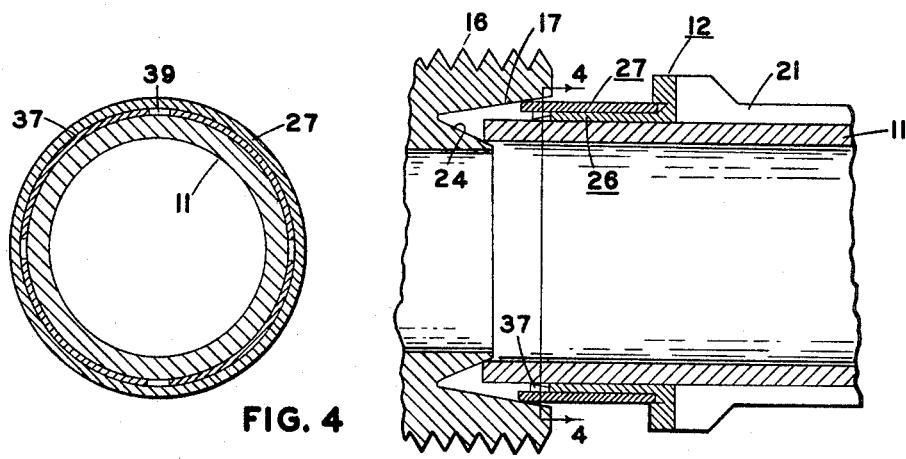
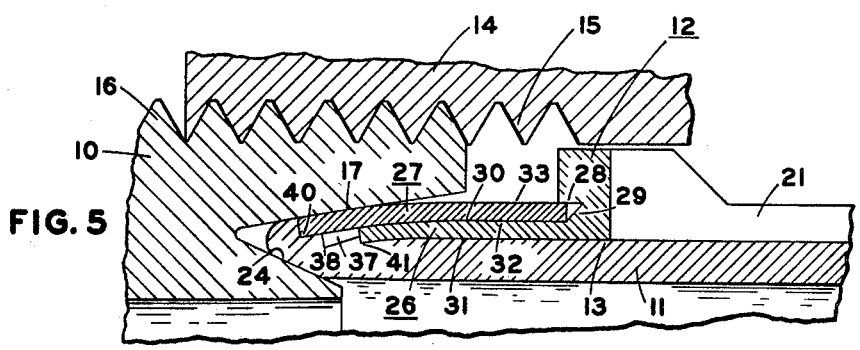
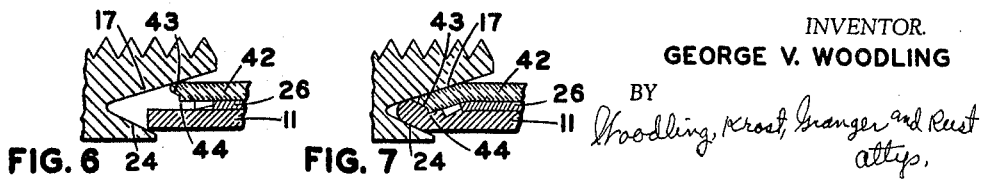
INVENTOR.
GEORGE V. WOODLING
BY
Woodling, Krost, Granger and Rust
attys.

United States Patent Office 3,278,206
Patented Oct. 11, 1966

3,278,206
COUPLING CONNECTION HAVING A LAMI-
NATED CONTRACTIBLE SLEEVE
George V. Woodling, 22077 West Lake Road,
Rocky River, Ohio
Filed Sept. 14, 1964, Ser. No. 396,208
7 Claims. (Cl. 285—334.5)

My invention relates to a laminated sleeve for a coupling connection between a connection body and a connection element having an outer substantially cylindrical surface, such as a tube, for example.

In a coupling connection of the type employing a hard contractible sleeve, the assembly man usually complains that the nut turns down too hard, particularly on the larger size couplings.

An object of the present invention is the provision of a hard contractible sleeve which cams in relatively easily thereby requiring a minimum amount of torque in tightening the nut.

Another object of the invention is the provision of a laminated annular sleeve having an outer and inner contractible sleeve portion, in which the inner sleeve portion is slotted to provide for easy camming.

Another object is to provide for making the inner contractible sleeve portion of harder material than the outer sleeve portion.

Another object is the provision of a laminated sleeve having an inner sleeve portion and an outer sleeve portion, wherein the inner sleeve portion makes a mechanical gripping action with the tube to prevent the tube from being hydraulically forced or blown out of the coupling connection and wherein the outer sleeve portion makes a fluid seal with the tube to prevent leakage.

Another object is to make the wall of the outer contractible sleeve portion with a greater thickness than that of the inner contractible sleeve portion and also with a softer material, whereby it may be cammed in easily.

Another object is to prevent the tube or connection element from turning within the coupling connection.

Another object is to bite the tube or connection element with one or more segmental fingers or arcuate body portions having an arcuate biting edge to thereby leave one or more uncut portions at spaced annular intervals around the tube or the connection element for preventing the turning thereof within the coupling connection.

Another object is to support the back side of the self-flare of the tube end with an outer contractible sleeve portion having a relatively thick back-up wall.

Another object is to case-harden the outer surface of the relatively thick wall of the outer contractible sleeve.

Other objects and a fuller understanding of the invention may be had by referring to the following description and claims, taken in conjunction with the accompanying drawings, in which:

FIGURE 1 is a longitudinal view of a coupling connection embodying features of my invention, with a portion cut away to illustrate the sleeve, the figure being drawn to two-times scale for a one-half inch tube coupling;

FIGURE 2 is a cross-sectional view taken along the line 2—2 of FIGURE 1, showing principally the segmental gripping fingers which grip the tube when the nut is tight for absorbing fluid shocks and vibration;

FIGURE 3 is an enlarged fragmentary view, showing principally the sleeve in relation to the tube and the connection body preparatory to assembly, the figure being drawn to four-times scale;

FIGURE 4 is a cross-sectional view taken along the line 4—4 of FIGURE 3 and showing only the sleeve and the tube;

FIGURE 5 is an enlarged and fragmentary cross-sectional view of the assembled coupling connection, the figure being drawn to eight-times scale; and FIGURES 6 and 7 are respectively fragmentary views of FIGURES 3 and 5, but showing the outer contractible sleeve portion with a thicker wall to support the back side of the self-flare of the tube end.

With reference to the drawing, my invention is shown as being applied to a tube coupling comprising a connection body 10, a tube 11 adapted to be connected thereto, a clamping sleeve 12 having a bore 13 closely surrounding the tube, and a nut 14 having female threads 15 adapted to threadably engage male threads 16 on the connection body 10. The righthand end portion of the connection body 10 has a tapered recess portion therein defining an inwardly tapering annular internal camming surface 17 against which the sleeve 12 is forced by the tightening action of the nut 14.

The claming sleeve 12 has a forward or lefthand end, generally referred to as a contractible end portion, and a rearward or righthand end, generally referred to as a tube-gripping portion to absorb fluid shocks and vibration. The tube-gripping portion may be the same as that shown in my Patent No. 2,532,352 and may comprise segmental spring fingers 21 having slots 22 therebetween. When the nut 14 is tightened, the spring fingers 21 are pressed against the tube to absorb fluid shocks or vibration.

The recess portion of the connection body also may be provided with an outwardly tapering annular wedge having a wedging surface 24 against which the end of the tube is forced for self-flaring as the nut is tightened. In my invention, the annular wedge may be machined as an integral part of the connection body, although a separately machined wedge may be employed.

The end of the tube extends beyond the contractible end portion of the sleeve which comprises an inner sleeve portion 26 and an outer sleeve portion 27 surrounding the inner sleeve portion. The inner sleeve portion 26 has an annular groove 28 terminating in an annular beveled shoulder 29 against which the righthand end of the outer sleeve portion 27 abuts. The inner sleeve portion 26 comprises a continuous annular body having an outer substantially cylindrical surface 30 and an inner substantially cylindrical surface 31 closely surrounding the outer surface of the tube. The outer sleeve portion 27 comprises a continuous annular body having an inner substantially cylindrical surface 32 closely surrounding the outer surface 30 of the inner sleeve portion 26 and an outer substantially cylindrical surface 33 disposed to cam against the annular internal camming surface 17.

The lefthand end of the inner sleeve portion 26 has a slotted contractible end portion comprising preferably a plurality of segmental biting fingers 37, four being shown in the drawing, each having an arcuate biting edge 38. Longitudinally extending slots 39 separate the segmental biting fingers 37. The slots extend from the arcuate biting edge 38 in a rearward direction and terminate underneath the outer sleeve portion 27. Any number of slots may be used. When one slot is used, the segmental finger comprises substantially a complete circumferential body, except for the slot.

The left-hand end of the outer sleeve portion 27 projects beyond the arcuate biting edge 38 of the inner sleeve portion 26. The end of the outer sleeve portion 27 terminates in a circumferential biting edge 40. The nut, when it is being tightened, forces the outer surface 33 of the outer sleeve portion 27 against the annular internal camming surface 17 and thereby cams the slotted contractible end portion of the inner sleeve portion 26 and the projecting contractible end portion of the outer portion 27 respectively against the outer surface of the tube, with the arcuate biting edge 38 and the circumferential biting edge 40 biting thereinto. This biting engagement constitutes a driving connection with the tube for forcing the end of the tube up the wedge surface 24 for self-flaring the tube end. The force of the nut in camming the outer surface 33 of the outer sleeve portion 27 against the internal camming surface 17 effects a sealing engagement therebetween, as well as effecting a sealing engagement respectively between the circumferential biting edge 40 of the outer sleeve portion and the backside of the self-flare of the tube end and between the outer surface 30 of the inner sleeve portion 26 and the inner surface 32 of the outer sleeve portion 27 to seal off the slots 39.

The inner substantially cylindrical surface 31 of the inner sleeve portion 26 is provided with an annular biting edge 41 for biting into the tube to effect an annular sealing engagement therewith. The biting edge 41 is provided by making a tapered recess under the segmental fingers 37, so as to present a stepped annular edge which meets with the bore of the inner sleeve 26 and defines therewith the biting edge 41. The tapered recess also provides a minimum thickness to the segmental fingers at the stepped edge to provide for easy camming of the segmental fingers.

When my coupling is used with steel tubing, the inner and outer sleeve portions are preferably constructed of steel which is capable of being quench-hardenable throughout its entire mass and thereafter tempered or drawn back to a hardness value greater than that of the tube. I find that steel known as 4140, heat-treated throughout its entire mass and tempered to a hardness value of approximately 30 to 45 Rockwell, is satisfactory for my sleeve. Preferably, the inner sleeve portion 26 is given a hardness value of approximately 38–42 Rockwell and the outer sleeve portion 27 is given a hardness value of approximately 30 to 36 Rockwell. The inner sleeve portion 26, being slotted, cams in relatively easily and since it is harder than the tube, it will cut into the tube and make a strong mechanical engagement therewith to resist blowout of the tube. Also, since the inner sleeve portion 26 is slotted, it will resist turning of the tube in the coupling since the segmental arcuate biting edges 38 of the segmental fingers 37 leave intervals of uncut portions of the tube occupied by the slots 39, and it is these uncut portions which resist the turning of the tube in the couplings.

A fluid seal is also effected where the right-hand end of the outer sleeve portion 27 abuts against the beveled shoulder 29. Preferably, the end of the outer sleeve portion 27 fits snugly into the groove 28, being preferably pressed therein to and thereby radially supporting the end of the outer sleeve portion. The snug fit of the outer sleeve portion 26 into the groove 28 also serves to keep the outer sleeve portion from becoming loose and possibly sliding off the inner sleeve portion 26, as it might otherwise do through handling prior to assembly of the tube connection. The combined wall thickness of the inner and outer sleeve portions 26 and 27 may be approximately .035–.404 inch, with the inner sleeve portion being approximately .016 inch and the outer sleeve portion being approximately .021 inch. The outer sleeve portion 27 will cam in relatively easily even though it is not slotted.

FIGURES 6 and 7 show respectively fragmentary views of FIGURES 3 and 5 with a modified outer sleeve portion 42 having a thicker wall than the outer sleeve 27 shown in the previous figures. The left-hand end of the outer sleeve portion 42 is provided with a flared back-up end-wall surface 43 which supports the backside of the self-flare of the tube end. The flared back-up end-wall surface 43 may be provided near its inside diameter with a small biting edge 44 to bite the tube or connection element for making a fluid seal therewith. The modified outer sleeve portion 42 is preferably made of mild or soft steel and is given a case-hardening treatment to make the outer surface thereof hard. The wall thickness of the modified outer sleeve portion 42 may preferably be approximately .021–.034 inch. It will cam in relatively easily even though it is relatively thick, since it is made of mild or relatively soft steel.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A coupling connection between a connection body and a connection element having an outer substantially cylindrical surface, said connection body having a tapered recess therein defining an annular inwardly tapering internal camming surface, sleeve means having a bore with said connection element extending therethrough, said sleeve means having a contractible end portion beyond which the end of said connection element extends, said contractible end portion of said sleeve means comprising an inner sleeve portion and an outer sleeve portion surrounding the inner sleeve portion, said inner sleeve portion having an annular shoulder and said outer sleeve portion having an abutting end portion abutting against said annular shoulder, said inner sleeve portion comprising a continuous annular body having an inner substantially cylindrical surface and an outer substantially cylindrical surface, said inner substantially cylindrical surface closely surrounding said outer substantially cylindrical surface of said connection element, said outer sleeve portion comprising a continuous annular body having an inner substantially cylindrical surface and an outer substantially cylindrically surface, said inner substantially cylindrical surface of said outer sleeve portion closely surrounding said outer substantially cylindrical surface of said inner sleeve portion, said outer substantially cylindrical surface of said outer sleeve disposed to cam against said annular internal camming surface of said connection body, said inner sleeve portion having a slotted contractible end portion including at least a segmental body having arcuate biting edge means thereon and at least a slot extending therefrom in a generally longitudinal direction, said slot terminating underneath said outer sleeve portion, said outer sleeve portion having a projecting contractible end portion extending longitudinally beyond said arcuate biting edge means of said inner sleeve portion, said projecting contractible end portion having circumferential biting edge means thereon, and force means engaging said sleeve means for forcing the outer substantially cylindrical surface of said outer sleeve portion against said annular internal camming surface and camming said slotted contractible end portion of said inner sleeve portion and said projecting contractible end portion of said outer sleeve portion respectively against the outer surface of said connection element with said arcuate biting edge means of said inner sleeve portion and said circumferential biting edge means of said outer sleeve portion biting thereinto and thereby providing a driving connection therewith, said force means upon forcing the outer substantially cylindrical surface of said outer sleeve portion against said annular internal camming surface effecting a sealing engagement respectively between said circumferential biting edge means of said outer sleeve portion and the outer surface of said connection element and between the outer substantially cylindrical surface of said inner sleeve portion and the inner substantially cylindrical surface of said outer sleeve portion to seal off said slot.

2. A tube coupling connection between a connection body and a tube having an outer substantially cylindrical surface, said connection body having a tapered recess therein defining an annular inwardly tapering internal camming surface, said recess also having a diverging annular wedge wall meeting with said camming surface, sleeve means having a bore with said tube extending therethrough, said sleeve means having a contractible end portion beyond which the end of said tube extends, said contractible end portion of said sleeve means comprising an inner sleeve portion and an outer sleeve portion surrounding the inner sleeve portion, said inner sleeve portion having an annular shoulder and said outer sleeve portion having an abutting end portion abutting against said annular shoulder, said inner sleeve portion comprising a continuous annular body having an inner substantially cylindrical surface and an outer substantially cylindrical surface, said inner substantially cylindrical surface closely surrounding said tube, said outer sleeve portion comprising a continuous annular body having an inner substantially cylindrical surface and an outer substantially cylindrical surface, said inner substantially cylindrical surface of said outer sleeve portion closely surrounding said outer substantially cylindrical surface of said inner sleeve portion, said outer substantially cylindrical surface of said outer sleeve disposed to cam against said annular internal camming surface of said connection body, said inner sleeve portion having a slotted contractible end portion including at least a segmental body having arcuate biting edge means thereon and at least a slot extending therefrom in a generally longitudinal direction, said slot terminating underneath said outer sleeve portion, said outer sleeve portion having a projecting contractible end portion extending longitudinally beyond said arcuate biting edge means of said inner sleeve portion, said projecting contractible end portion having circumferential biting edge means thereon, and force means engaging said sleeve means for forcing the outer substantially cylindrical surface of said outer sleeve portion against said annular internal camming surface and camming said slotted contractible end portion of said inner sleeve portion and said projecting contractible end portion of said outer sleeve portion respectively against the outer surface of said tube with said arcuate biting edge means of said inner sleeve portion and said circumferential biting edge means of said outer sleeve portion biting thereinto and thereby providing a driving connection therewith to force the end of the tube up the wedge wall to self-flare the tube end, said force means upon forcing the outer substantially cylindrical surface of said outer sleeve portion against said annular internal camming surface effecting a sealing engagement therebetween as well as effecting a sealing engagement respectively between said circumferential biting edge means of said outer sleeve portion and the outer surface of said self-flared tube end and between the outer substantially cylindrical surface of said inner sleeve portion and the inner substantially cylindrical surface of said outer sleeve portion to seal off said slot.

3. The coupling connection as claimed in claim 1, wherein said inner substantially cylindrical surface of said inner sleeve portion has annular biting edge means for biting into the outer substantially cylindrical surface of said connection element and effecting an annular sealing engagement therewith.

4. The coupling connection as claimed in claim 1, wherein said inner sleeve portion is of harder material than that of said outer sleeve portion.

5. The tube coupling connection as claimed in claim 2, wherein the outer sleeve has a flared back-up end-wall surface to support the back-side of the self-flare of the tube end.

6. The tube coupling connection as claimed in claim 2, wherein the outer sleeve has a flared back-up end-wall surface to support the back-side of the self-flare of the tube end, said flared back-up end-wall surface having provided thereon a biting edge to bite the backside of the self-flare tube-end.

7. The tube coupling connection as claimed in claim 2, wherein the slotted contractible end portion includes a plurality of segmental body portions each having arcuate biting edge means thereon to bite the tube and wherein said segmental body portions are separated by slots extending in a generally longitudinal direction from said arcuate biting edge means and terminating udnderneath said outer sleeve portion.

References Cited by the Examiner
UNITED STATES PATENTS

| | | | |
|---|---|---|---|
| 2,585,453 | 2/1952 | Gallagher et al. | 285—382.7 X |
| 2,701,149 | 2/1955 | Kreidel et al. | 285—382.7 X |
| 2,850,303 | 9/1958 | Bauer | 285—341 |
| 3,069,188 | 12/1962 | Crawford | 285—382.7 X |

CARL W. TOMLIN, *Primary Examiner.*

T. F. CALLAGHAN, *Assistant Examiner.*